Feb. 14, 1956   P. BÖTTCHER   2,734,398
DIFFERENTIAL GEARING
Filed Feb. 21, 1955   3 Sheets-Sheet 1

INVENTOR
PAUL BÖTTCHER
BY K.A. Mayr
ATTORNEY.

INVENTOR
PAUL BÖTTCHER
BY K. B. Mayr
ATTORNEY.

Feb. 14, 1956 P. BÖTTCHER 2,734,398
DIFFERENTIAL GEARING

Filed Feb. 21, 1955

INVENTOR
PAUL BÖTTCHER
BY K. H. Mayr
ATTORNEY

United States Patent Office 2,734,398
Patented Feb. 14, 1956

2,734,398

DIFFERENTIAL GEARING

Paul Böttcher, Hamburg-Grossflottbek, Germany

Application February 21, 1955, Serial No. 489,610

5 Claims. (Cl. 74—711)

The present invention relates to a differential gearing for motorized vehicles and more particularly to a hydraulic locking or braking system combined with such a gearing.

The object of the invention is the provision of a locking or braking system for a differential gearing for motorized vehicles whereby both rear axles of the vehicle are interlocked upon slipping or losing contact with the ground of one rear wheel and when the differential motion exceeds the maximum velocity which is required for normal movement of the vehicle in curves. The system according to the invention includes brake cylinders which are automatically refilled with oil taken from the sump in the housing of the differential gearing.

Conventional devices including hydraulic systems for retarding the differential motion when the car skids act too sluggishly to be effective. They are not suited to produce the required brake moment without overloading the mechanism and causing excessively high hydraulic pressures.

The locking device according to the invention includes reciprocating piston pumps, the novelty consisting essentially in an improved shape, position, and operation of the pistons. The pistons according to the invention are annular and positioned in the wall of the shell of the differential gearing coaxially of the rotation axis of the shell. The pistons are preferably located outside of the driven gears of the gearing. The pistons are axially moved upon relative rotation of the driven gears and the shell of the differential gearing by means of cams which project toothlike from the outer surfaces of the driven gears. In this way, a maximum piston surface can be obtained without increasing the diameter of the shell of the differential gearing. When the car skids, a small rotation of the driven gears relatively to the shell suffices to immediately impede or lock the differential movement. Because of the great active piston surface no excessive hydraulic pressure is generated even at great brake moments.

The pump cylinders are preferably interconnected by an oil passage, the oil being pumped to and fro through the passage at each piston stroke. The flow area of the passage is such that the oil pressure produced by the flow resistance of the passage or conduit in the respective pump cylinder does not interfere with the steering of the vehicle during normal movement in curves. If the differential movement, and the piston velocity depending therefrom exceeds the maximum velocity during normal operation of the car in curves, as is the case when one rear wheel slips or loses contact with the ground, the rising oil pressure overcomes the force with which a flow control means in the passage interconnecting the pump cylinders is normally held open. Further differential movement and acceleration of the idling rear wheel is prevented by locking of the pumps.

The novel features which are considered characteristic of the invention are set forth with particularity in the appended claims. The invention itself however and additional objects and advantages thereof will best be understood from the following description of an embodiment thereof when read in conjunction with the accompanying drawing, in which Fig. 1 is a longitudinal sectional view of a bevel gear differential gearing according to the invention, the section being made at a right angle to the axis of the shaft supporting the planetary gears;

The same numerals designate the same parts in all figures.

Figure 1:
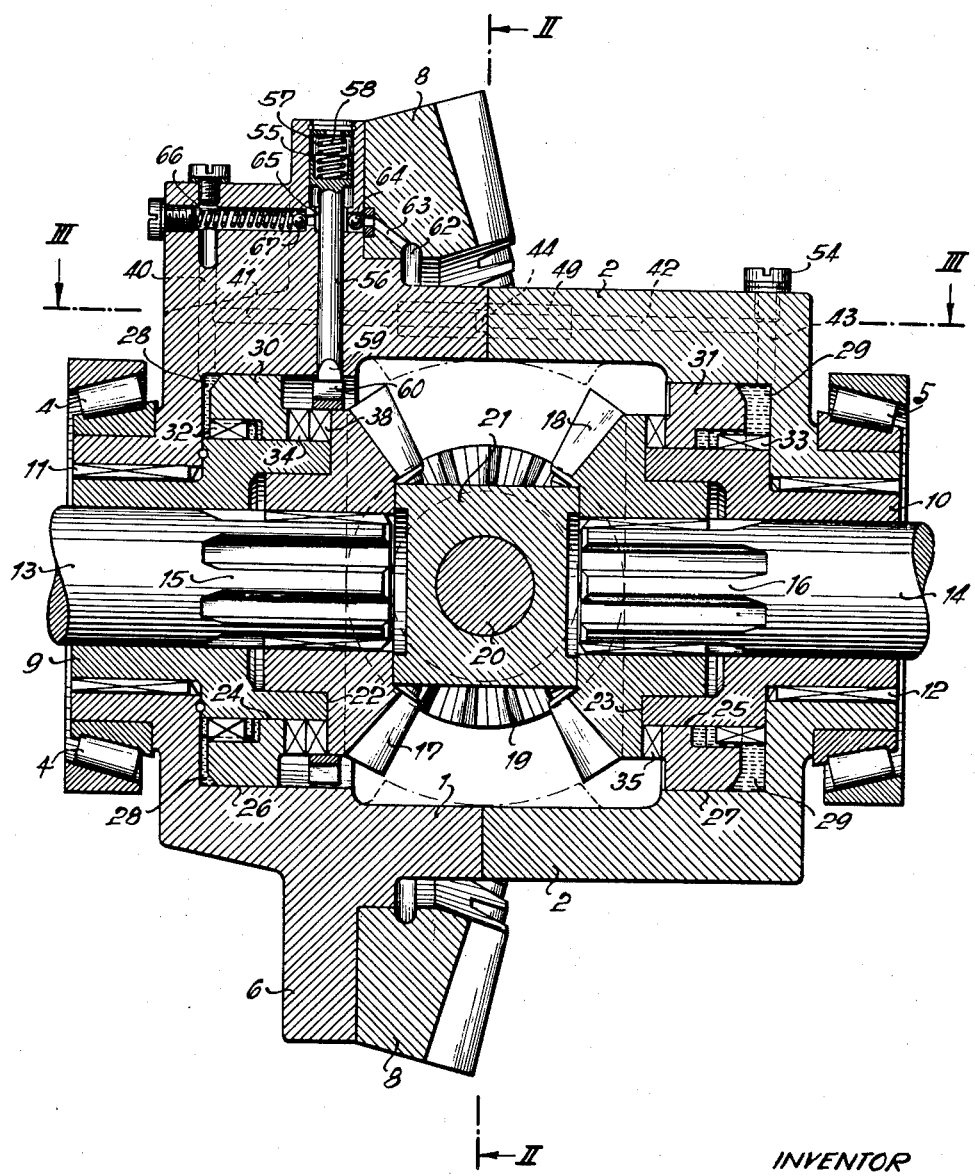
Fig. 1a is a plan view of a part of the periphery of the inner parts of the gearing, the cover being omitted.

Referring more particularly to the drawing, numerals 1 and 2 designate two halves of a shell, the halves being connected in the conventional manner by bolts 3 and the shell being rotatably supported by cone roller bearings 4 and 5. The shell half 1 is provided with a flange 6 to which a ring gear 8 is bolted by bolts 7.

Bearing bushings 9 and 10 are press-fitted into axial bores of the shell halves 1 and 2, respectively. Keys 11 and 12 prevent rotation of the bushings 9 and 10, respectively, relatively to the shell halves. Axles 13 and 14 are rotatable in the bushings 9 and 10, respectively. The ends of the axles 9 and 10 are splined at 15 and 16, respectively, for fastening gears 17 and 18 to the axles 9 and 10, respectively. The gears 17 and 18 are driven by a pair of planetary gears 19 rotatably supported by a gear holding shaft 20 supported by the shell 1, 2. A pressure element 21 is interposed between the planetary gears 19 and supported by the shaft 20 for receiving pressure exerted by the gears 17 and 18 in the direction towards the center of the differential gearing, i. e. for transmitting axial pressure from one of the gears 17, 18 to the other gear. The axial pressure is caused by the hydraulic pressure produced by pistons which will be described later. In conventional differentials an axial pressure is created which pressure is in the direction away from the point of the cone of the bevel gears. In the illustrated differential a pressure acts in axial direction also away from the point of the cone of the bevel gear when the car runs in a curve. The differential according to the invention includes hydraulic cylinder chambers 28 and 29 containing pistons 30 and 31, respectively, which are pressed, one at a time, with great force against the bevel gears 17 and 18, respectively. If the pressure element 21 were omitted, this pressure would be transmitted through the bevel gear 19 to the relatively weak shaft 20. This is avoided by the provision of the pressure receiving element 21 which affords absorption of pressure directed towards the point of the cones of the bevel gears so that the pressure does not act on the shaft 20 but on the casing of the differential, i. e., on the faces 22 and 23 of the bushings 9 and 10.

The chambers 28 and 29 are annular and are formed by outer circumferential surfaces 24 and 25 of the bushings 9 and 10, respectively, and the inner cylindrical surfaces 26 and 27 of the shell halves 1 and 2, respectively, the annular pistons 30 and 31, respectively, being axially slidably inserted in the chambers 28 and 29. The pistons 30 and 31 are secured against rotation by keys 32 and 33, respectively.

Figure 1A:
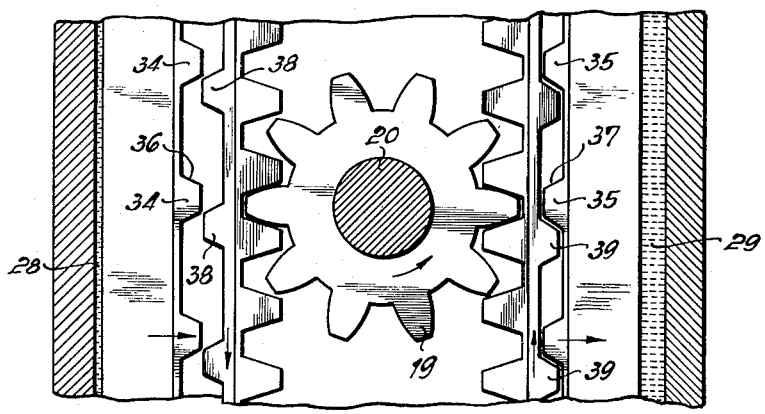

The outer surfaces of the gears 17 and 18 are provided with toothlike brake cams 38 and 39, respectively (Fig. 1a), whose inclined faces mate with inclined faces 36, 37 of corresponding brake cams 34, 35, respectively, toothlike axially projecting from the end faces of the pistons 30 and 31, respectively. A differential movement or rotation of the gears 17 and 18 in the differential gearing shell is possible only, if the inclined faces of the brake cams on the gears 17 and 18 slide on the mating inclined faces of the brake cams on the pistons 30 and 31, so that the pistons are moved axially.

Figure 3:
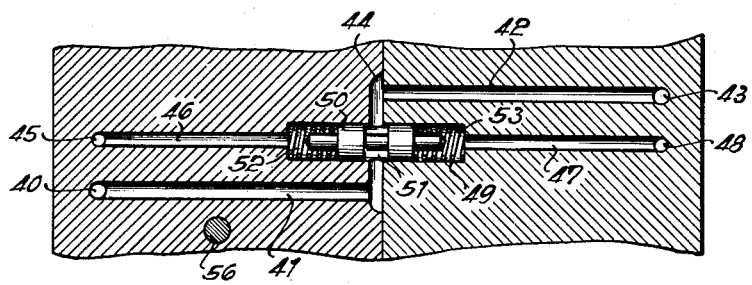
Fig. 3 is a sectional view of a portion of the shell for the differential gearing, the section being taken along line III—III in Fig. 1.
Figure 2:
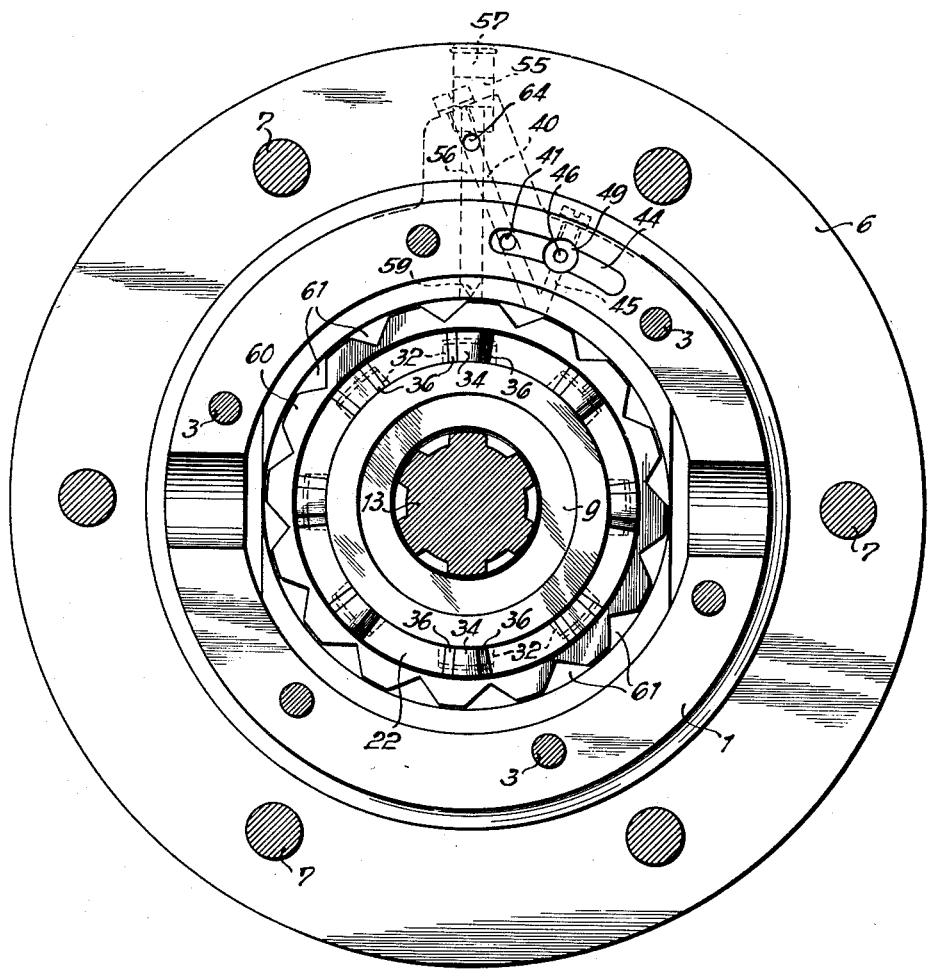
Fig. 2 is a sectional view of the differential gearing taken along line II—II in Fig. 1, the gears being omitted.

The cylinder chambers 28 and 29 communicate through bores 40, 41, 42, and 43 in the shell 1, 2 and through a recess 44 in the face of the shell half 1 (Fig. 3). A second connection of the cylinder chambers 28 and 29 is established by means of bores 45, 46, 47, 48, the bores 46 and 47 being connected by a bore 49 of greater diameter. A piston valve 50 having an annular groove 51 is slidable in the bore 49 and held in middle position by means of springs 52 and 53 during normal operation of the car, so that oil serving as a brake fluid can freely flow through the annular groove 51 and through the recess 44.

The passage formed by the bores 40, 41, 42, 43 and by the recess 44 can be controlled, i. e. can be more or less throttled by manipulating an adjustment screw 54.

A small piston pump for pumping oil from the sump in the differential housing is built into the flange 6. The pump consists of a piston 55 at the end of a piston rod 56 which reciprocates in a radial bore 57. A coil spring 58 presses the end 59 of the piston rod 56 against a cam ring 60 which is press-fitted to the circumference of the gear 17. The cam ring 60 has recesses or gaps 61 interposed between the actual cam surfaces. An annular groove 62 in the ring gear 8 acts as a scoop. The groove 62 reaches below the oil level in the differential housing (not shown) and is filled with oil by centrifugal action. The latter forces oil from the groove 62 into a bore 63 and through a check valve 64 into the cylinder space 65 of the oil pump. Because of the centrifugal force, operation of the pump does not depend on the suction action of the pump which is unreliable.

The oil is pumped through a filler valve 67, which is yieldingly closed by a coil spring 66, into the bore 40 and therefrom into the cylinders 28 and 29.

The device operates as follows:

The toothlike brake cams 38 and 39 are so arranged on the backs or outer surfaces of the driven gears 17 and 18 that the annular pistons 30, 31 are axially moved in the same direction upon opposite rotation of the gears 17 and 18. While the first piston performs a pump stroke, pressing the oil out of its cylinder, the second piston performs a suction stroke so that the oil forced out of the first cylinder flows through the channels or conduits 40 to 43 and the recess 44 into the second cylinder. For affording a free to and fro flow of the oil between the cylinders 28 and 29, the gaps between the brake cams are preferably made so great that the pump stroke of one piston begins a little later than the suction stroke of the other piston. Loading the pistons by springs is not needed because there is always oil pressure acting on the pistons.

The piston speed depends on the rotational speed of the gears 17, 18 and on the angle of inclination of the mating surfaces of cams 34, 35, 38, and 39. Due to the throttling effect of the connecting passages 40 to 44, an excess pressure is produced in the cylinder from which oil is expelled, the greatness of the excess pressure being determined by the piston velocity and the flow area of the passage connecting the cylinders.

The device is so constructed that the aforedescribed excess pressure is negligible during normal movement of the car through curves so that steering of the car is not impaired. If, however, the gears 17, 18 and consequently the pistons 30 and 31 are abnormally accelerated because one of the rear wheels loses contact with the ground or slips, the rapidly increasing excess pressure overcomes the force of one of the springs 52, 53 so that the piston valve 50 moves in axial direction, temporarily interrupting the oil flow through the groove 51 and between the cylinders 28 and 29. The oil locked in the cylinders 28 and 29 prevents farther axial movement of the pistons 30 and 31 so that the gears 17, 18 cannot rotate. A rapid differential movement is prevented after a small relative rotation of the rear wheels of the car whenever the cams of the pistons and of the gears engage each other.

The piston 55 of the filler pump is pressed by the spring 58 against the cam ring 60. The piston rod 56 is moved upon rotation of the cam ring 60 and of the gears 17, 18 only when oil has leaked out of the brake system. If the system is completely filled with oil, the oil in the cylinder of the filler pump counteracts the piston pressure during the movements when the end 51 of the piston rod 56 is over a tooth gap 61 and not supported by the cam ring 60. During these moments the spring 58 acts on the piston 55 and consequently exerts pressure on the oil filling the hydraulic brake system. This pressure forces air out of the system. Because of the centrifugal force acting on the oil, air which may have entered the system is forced towards the rotation axis of the differential gearing and is continuously removed together with leakage oil by the hydraulic pressure caused by the spring 58, if, as is preferred, the oil leaks between the inner surfaces of the annular pistons 30 and 31 and the outer surfaces of the bushings 9 and 10, i. e. at the shortest distance of the oil in the brake system from the rotation axis of the differential gearing.

In order to assure free to and fro flow of the oil between the brake cylinders the tooth gaps 61 on the cam ring 60 are so arranged relatively to the brake cams that the spring 58 causes an excess pressure in the hydraulic system or refilling only at dead center position of the pistons 30, 31 and not while the pistons are moving.

While a specific embodiment of the invention has been shown and described, it will be apparent to those skilled in the art that various changes, modifications, substitutions, additions and omissions may be made therein without departing from the spirit and scope of the invention as set forth in the appended claims.

What is claimed is:

1. A differential gearing for vehicles comprising a rotatable shell, axles rotatably extending into said shell, driven gears fast at the end of said axles, planetary gears rotatable in said shell and meshing with said driven gears, annular piston chambers in said shell coaxially of said axles, an annular piston in each of said chambers, means connected with said driven gears and with said pistons for axially moving the latter in their chambers upon relative rotation of said driven gears and said shell, means for forcing a fluid into said chambers, conduits in said shell for receiving fluid forced by said pistons out of said cylinders, and fluid flow control means in said conduits.

2. A differential gearing as defined in claim 1, including means holding said pistons against rotation relatively to said shell.

3. A differential gearing according to claim 1, in which said means connected with said driven gears and with said pistons include first cams axially extending from the outer surfaces of said driven gears, and second cams axially extending from the surfaces of said pistons facing said driven gears, said first and second cams cooperating for axially moving said pistons upon relative rotation of said driven gears and of said shell.

4. A differential gearing as defined in claim 1, in which said conduits interconnect said piston chambers.

5. A differential gearing as defined in claim 1, said conduits forming a passage interconnecting said piston chambers, a piston valve in said passage, resilient means holding said valve normally in an open position and affording movement of said valve to close said passage upon increase of the fluid pressure in one of said piston chambers.

No references cited.